US012571781B2

(12) United States Patent
Kang

(10) Patent No.: US 12,571,781 B2
(45) Date of Patent: Mar. 10, 2026

(54) VERIFICATION METHOD AND SYSTEM FOR A SAMPLE INTRODUCTION DEVICE DEDICATED TO GAS CHROMATOGRAPHY FOR PRECISELY MEASURING A CONCENTRATION OF ATMOSPHERIC GREENHOUSE GAS CONTAINED IN A TEDLAR BAG

(71) Applicant: KOREA RESEARCH INSTITUTE OF STANDARDS AND SCIENCE, Daejeon (KR)

(72) Inventor: Nam Goo Kang, Daejeon (KR)

( * ) Notice: Subject to any disclaimer, the term of this patent is extended or adjusted under 35 U.S.C. 154(b) by 320 days.

(21) Appl. No.: 18/138,040

(22) Filed: Apr. 22, 2023

(65) Prior Publication Data

US 2024/0353382 A1     Oct. 24, 2024

(51) Int. Cl.
G01N 30/86 (2006.01)
G01N 1/22 (2006.01)
*G01N 30/02* (2006.01)

(52) U.S. Cl.
CPC ....... G01N 30/8665 (2013.01); G01N 1/2273 (2013.01); *G01N 2030/025* (2013.01)

(58) Field of Classification Search
CPC .. G01N 1/2273; G01N 30/8665; G01N 30/16; G01N 2030/025; G01N 2030/884; G01N 30/02; G01N 2030/042
See application file for complete search history.

(56) References Cited

U.S. PATENT DOCUMENTS

| | | | | |
|---|---|---|---|---|
| 7,281,404 | B2 * | 10/2007 | Peng .................. | G01N 33/0006 73/1.06 |
| 8,549,894 | B2 * | 10/2013 | Hoogerwerf ........... | G01N 30/32 73/23.42 |
| 10,955,389 | B2 * | 3/2021 | Aono ..................... | G01N 30/12 |
| 2019/0248976 | A1 * | 8/2019 | Mukaiyama ............ | C08L 61/06 |

* cited by examiner

*Primary Examiner* — Justin R Knapp

(57) ABSTRACT

The present application provides a verification method and system of a sample introduction device dedicated to gas chromatography for precisely measuring a concentration of atmospheric greenhouse gas. The verification method of a sample introduction device dedicated to gas chromatography for precisely measuring a concentration of atmospheric greenhouse gas includes the steps of: 1) calculating, by a bias size calculation unit, a degree of bias in a tedlar bag using a correlation between a bias of $P_{bag}$ to $P_{cyl}$ and a bias of $x_{bag}$ to $x_{cyl}$; and 2) determining, by a device performance determination unit, a device having the smallest value of a size of the bias calculated from the bias size calculation unit as an optimal device.

9 Claims, 5 Drawing Sheets

[FIG. 1]
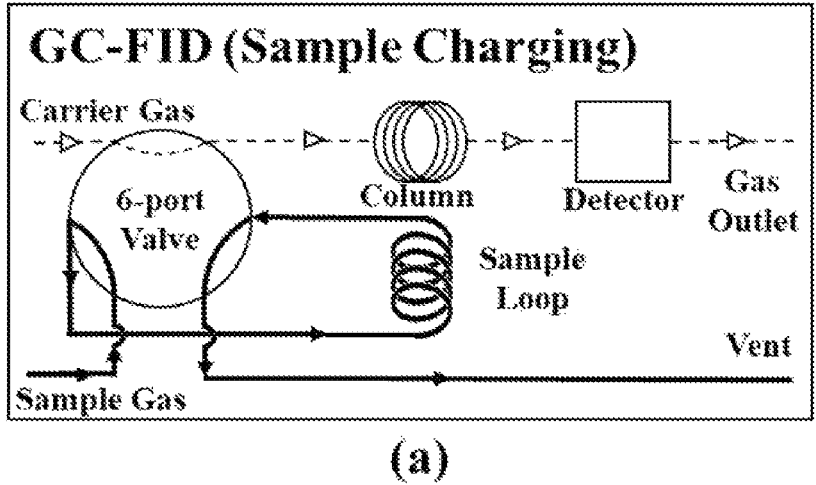
(a)
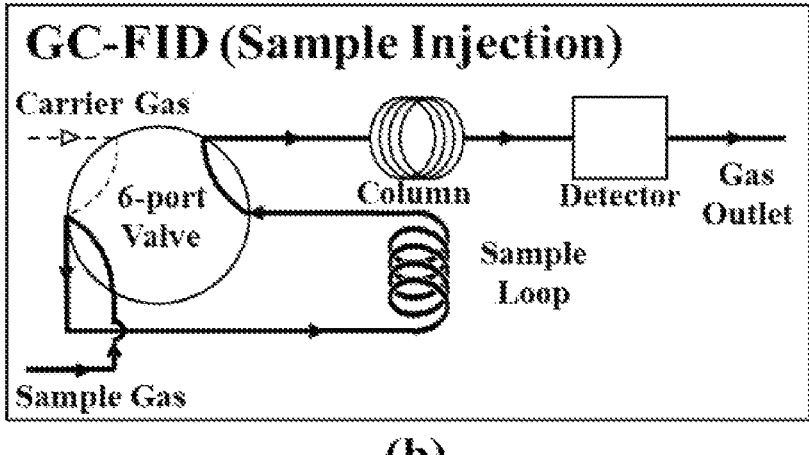
(b)

[FIG. 2]
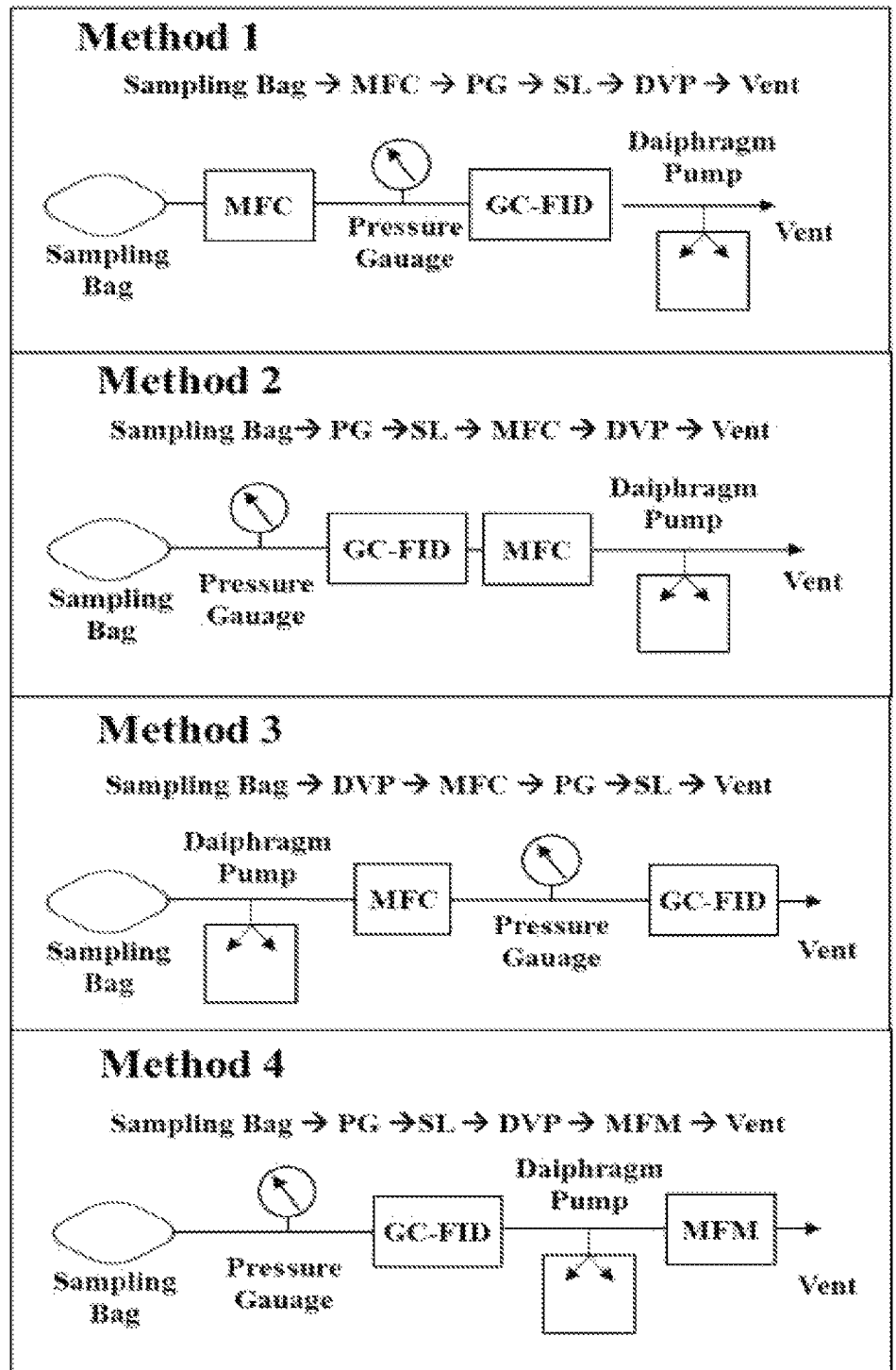

[FIG  3]
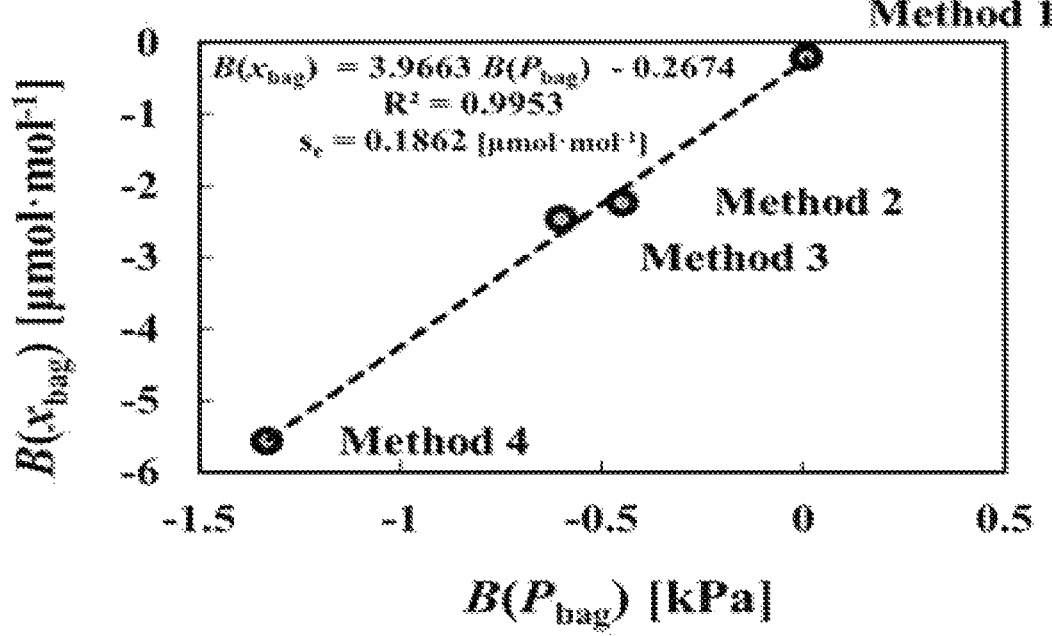
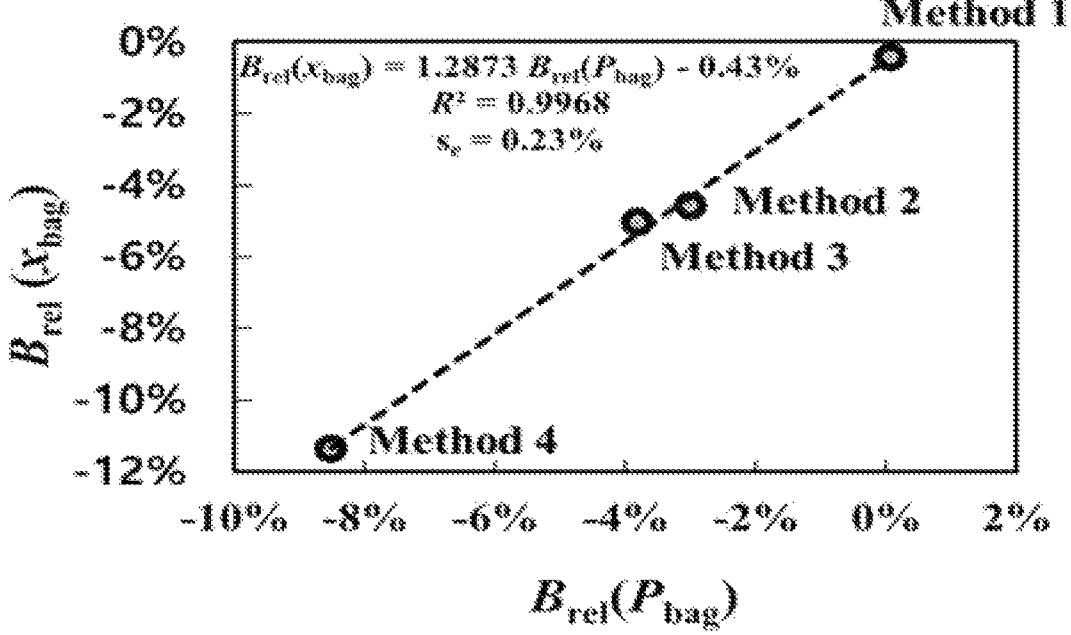

[FIG. 4]
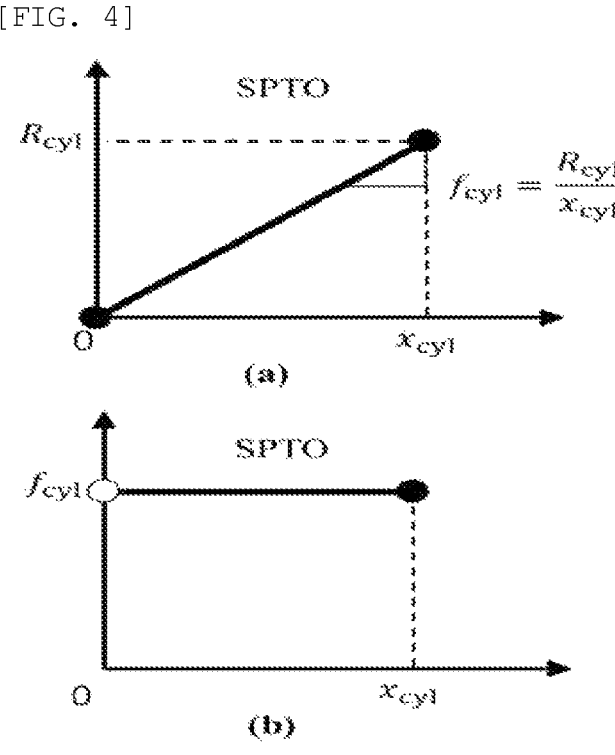
(a)
(b)
[FIG. 5]
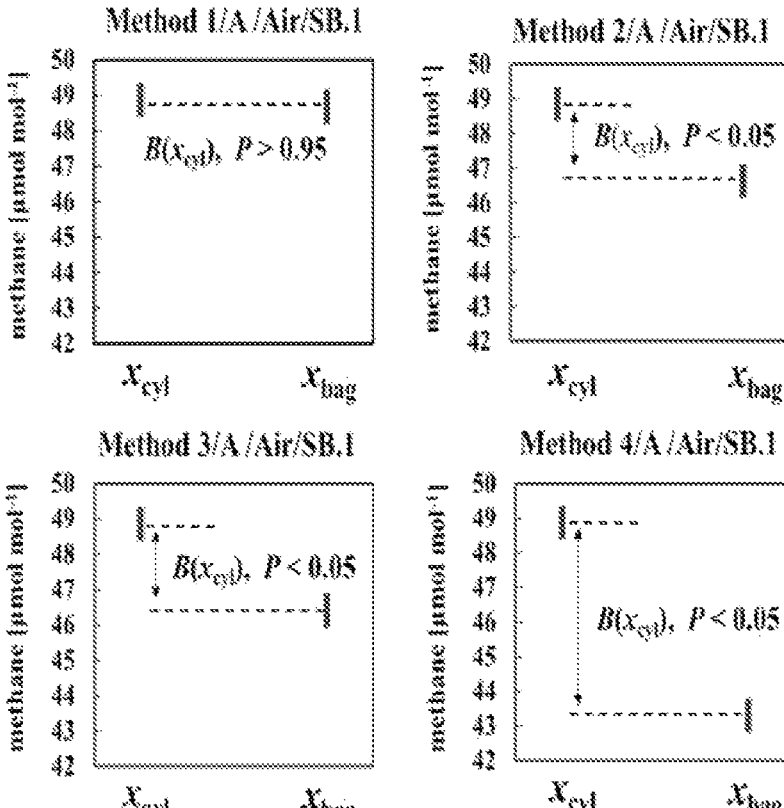

[FIG. 6]
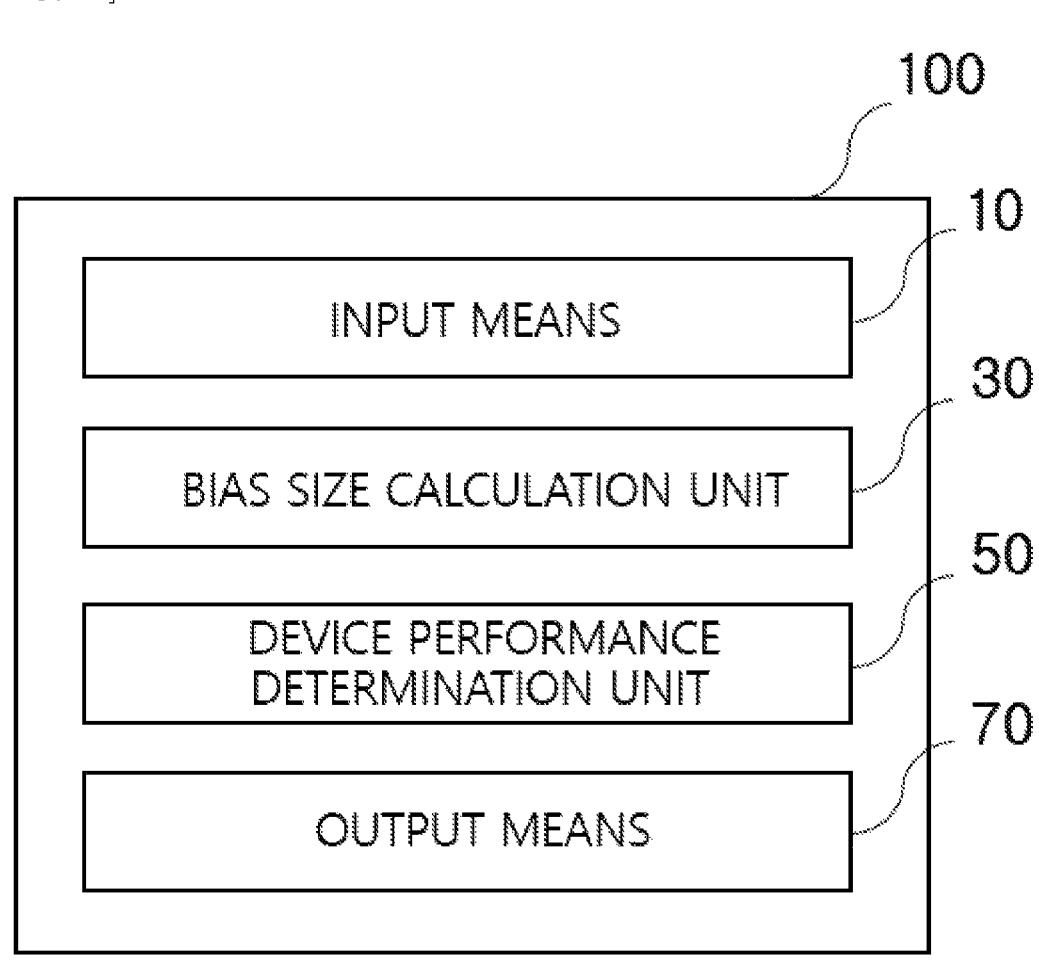

VERIFICATION METHOD AND SYSTEM FOR A SAMPLE INTRODUCTION DEVICE DEDICATED TO GAS CHROMATOGRAPHY FOR PRECISELY MEASURING A CONCENTRATION OF ATMOSPHERIC GREENHOUSE GAS CONTAINED IN A TEDLAR BAG

BACKGROUND

Field

The present application relates to a verification (calibration) method and system for a sample introduction device dedicated to gas chromatography, more particularly, to a verification technique for the performance of each sample introduction device of gas chromatography equipment for measuring an atmospheric sample gas, and specifically, to a verification technique for a sample introduction device dedicated to gas chromatography for precisely measuring a concentration of atmospheric greenhouse gas contained in a tedlar bag.

The present invention was made with financial support from the Rural Development Administration of Republic of Korea under the title of "Establishment of System for Screening Low Methane Gas Emission Rice Germplasm" (No. 1395075870).

Description of the Related Art

In laboratory and field measurements for various research and industries such as agricultural meteorology, environmental monitoring, biological testing, energy production, and the like, the technical requirements for precisely measuring fractions of constituent species in a gas sample which is typically captured in a tedlar bag are increasing.

In particular, in order to reliably measure methane released into the atmospheric environment from man-made sources, it is particularly important in practice to precisely determine the mole fraction of methane in the tedlar bag by typically using gas chromatography. For example, gas samples captured in agricultural environments (e.g., air samples obtained from a greenhouse gas flux chamber arranged in a rice paddy or field) are typically collected in a portable tedlar bag, followed by performing subsequent laboratory analysis.

Such a tedlar bag is the preferred means for gas sampling, and is typically made from lightweight, easy-to-handle, diverse functional plastic polymers in terms of obtaining an adequate sampling volume from a target source.

Gas chromatography is the most frequently used method in order to determine the mole fractions of various greenhouse gases. For this, in the gas chromatography, gas sample loop injection is traditionally used. A gaseous sample is usually injected through an automatic gas sampling valve equipped with a stainless steel sample loop having a fixed internal volume usually ranging from 0.1 to 10 $cm^3$ in volume.

The sample loop injection system is the most precise technique available today, because of its ability to precisely control the injection volume of the gas in a predetermined range. The Korea Research Institute of Standards and Science (KRISS), in particular, uses a sample loop injection system for analyzing a sample gas mixture contained in a high-pressure cylinder.

For example, in order to introduce samples from different containers, a two-way valve (e.g., a six-position valve) is used in the sample loop injection system. As the two-way valve, a stainless steel tube with a known volume is used, which is alternately connected to a sample gas stream and a carrier gas stream.

In a typical approach, determining the mole fraction of methane, a greenhouse gas in accordance with international and national n regulations, is performed using a gas chromatograph with a flame ionization detector (GC-FID). The sample gas mixture is captured by commercially available sampling with a volume of 2 L capacity almost in atmospheric conditions (slightly greater than 0.1 Mpa).

The sample gas mixture is typically compared with a calibration gas mixture in a "tedlar bag," which is a container of the same type. Therefore, it is necessary for the analyst to prepare a calibration tedlar bag in the course of routine gas transfer from a high-pressure calibration gas cylinder (at least 1 Mpa at ambient temperature) to an empty tedlar bag (usually by filling it to about 80% of its volumetric capacity).

This routine step is inefficient, and therefore, development of a precise method for direct comparison of the sample gas component (methane) from the tedlar bag with the gas component of the high-pressure calibration gas cylinder is required. The gas pressure in the fixed-volume sample loop of the gas chromatograph (GC) should be the same regardless of whether a tedlar bag or high-pressure gas cylinder is used at a substantial atmospheric pressure.

Guidelines for reliable gas sampling methods that meet these needs are scarce in the literature. In particular, it is also difficult to find research papers reporting experimental evidence for uncertainties associated with possible bias resulting from an imprecise sampling method.

Here, the present inventor has tried to find a best sampling method of determining the mole fraction of methane in the tedlar bag through direct comparison with the mole fraction of methane in the calibration gas cylinder based on single-point through-origin (SPTO) which is one of the most frequently used methods. As a result, the present application presents measurement bias and uncertainty from the evaluation of various gas sampling methods using GC-FID. Calibrations of this type will frequently be used for major comparisons between countries in the national metrology institutes, particularly in the specialty field of gas analysis.

SUMMARY

Therefore, an object of the present invention is to provide a verification method and system for a sample introduction device dedicated to gas chromatography for precisely measuring a concentration of atmospheric greenhouse gas contained in a tedlar bag, in order to design a peripheral auxiliary device that allows a concentration of a specific gas injected into the tedlar bag using gas chromatography, a general-purpose equipment for gas analysis, after a standard gas contained in a high-pressure gas cylinder for calibration is injected into the tedlar bag for field gas collection and a concentration of the standard gas contained in the high-pressure gas cylinder for calibration to be precisely matched with each other.

The above-described technical problems are achieved by the following means.

(1) A verification method of a sample introduction device dedicated to gas chromatography for precisely measuring a concentration of atmospheric greenhouse gas, the method comprising the steps of:

calculating, by a bias size calculation unit, a degree of bias in a tedlar bag using a correlation between a bias of $P_{bag}$ to $P_{cyl}$ and a bias of $x_{bag}$ to $x_{cyl}$; and determining, by a device performance determination unit, a device having the smallest value of a size of the bias calculated from the bias size calculation unit as an optimal device.

(2) The method according to the above (1), wherein the bias is an absolute bias of $P_{bag}$ to $P_{cyl}$, and an absolute bias of $x_{bag}$ to $x_{cyl}$.

(3) The method according to the above (2), wherein the correlation is represented by Equation I below:

$$B(x_{bag}) = 3.9663 \cdot B(P_{bag}) - 0.2674. \tag{I}$$

(4) The method according to the above (1), wherein the bias is a relative bias of $P_{bag}$ to $P_{cyl}$, and a relative bias of $x_{bag}$ to $x_{cyl}$.

(5) The method according to the above (4), wherein the correlation is represented by Formula II below:

$$B_{rel}(x_{bag}) = 1.2873 \cdot B_{rel}(P_{bag}) = -0.43\%. \tag{II}$$

(6) A verification system of a sample introduction device dedicated to gas chromatography for precisely measuring a concentration of atmospheric greenhouse gas, the system comprising:

a bias size calculation unit configured to calculate a degree of bias in a tedlar bag using a correlation between a bias of $P_{bag}$ to $P_{cyl}$ and a bias of $x_{bag}$ to $x_{cyl}$; and a device performance determination unit configured to determine a device having the smallest value of a size of the bias calculated by the bias size calculation unit as an optimal device.

(7) The system according to the above (6), wherein the correlation is represented by Equation I below:

$$B(x_{bag}) = 3.9663 \cdot B(P_{bag}) - 0.2674. \tag{I}$$

(8) The system according to the above (6), wherein the correlation is represented by Formula II below:

$$B_{rel}(x_{bag}) = 1.2873 \cdot B_{rel}(P_{bag}) = -0.43\%. \tag{II}$$

(9) The method according to the above (1), wherein a target gas species is a greenhouse gas.

(10) A computer readable recording medium recorded with a program which executes the verification method of a sample introduction device dedicated to gas chromatography for precisely measuring a concentration of atmospheric greenhouse gas according to any one of the above (1) to (5).

According to the present invention, it is possible to provide a verification method and system for a sample introduction device dedicated to gas chromatography for precisely measuring a concentration of atmospheric greenhouse gas contained in a tedlar bag, in order to design a peripheral auxiliary device that allows a concentration of a specific gas injected into the tedlar bag using gas chromatography, a general-purpose equipment for gas analysis, after a standard gas contained in a high-pressure gas cylinder for calibration is injected into the tedlar bag for field gas collection and a concentration of the standard gas contained in the high-pressure gas cylinder for calibration to be precisely matched with each other.

BRIEF DESCRIPTION OF THE DRAWINGS

The above and other objects, features and other advantages of the present invention will be more clearly understood from the following detailed description taken in conjunction with the accompanying drawings, in which:

FIG. 1 is schematic diagrams illustrating configurations of a sample loop and an automatic valve system in a GC-FID according to the present invention;

FIG. 2 is diagrams comparing four different gas sampling methods according to the present invention;

FIG. 3 is graphs illustrating the correlation between a bias of $P_{bag}$ to $P_{cyl}$ and a bias of $x_{bag}$ to $x_{cyl}$ depending on the device configuration;

FIG. 4 is graphs of SPTO calibration according to the present invention;

FIG. 5 is diagrams comparing the bias and uncertainty associated with mole fractions of methane from a calibration cylinder and a tedlar bag, which are prepared in air balance with four different sampling methods according to the present invention; and FIG. 6 is a block diagram illustrating a configuration of a system according to the present invention.

DETAILED DESCRIPTION OF EMBODIMENTS

Hereinafter, preferred embodiments according to the present invention will be described in detail with reference to the accompanying drawings. The detailed description to be described below with reference to the accompanying drawings is intended to illustrate exemplary embodiments of the invention and is not intended to represent the only embodiment in which the invention may be executed. The following detailed description includes specific details in order to provide a complete understanding of the present invention. However, those skilled in the art will appreciate that the present invention may be executed without these specific details.

In some cases, well-known structures and devices will not be described or will be illustrated in a block diagram form centering on core functions of each structure and apparatus, to avoid obscuring concepts of the present invention.

In the specification, when the explanatory phrase a part "comprises or includes" a component is used, this means that the part may further include the component without excluding other components, so long as special explanation is not given. Further, the term " . . . unit" described in the specification means a unit for processing at least one function or operation. In addition, as used herein the context for describing the present invention (particularly, in the context of the following claims), the singular forms "a," "an," "one" and "the" are intended to include the plural forms as well, unless the context clearly denotes otherwise in the specification or is clearly limited by the context.

In description of preferred embodiments of the present invention, the publicly known functions and configurations that are judged to be able to make the purport of the present invention unnecessarily obscure will not be described in detail. Further, wordings to be described below are defined in consideration of the functions of the present invention, and may differ depending on the intentions of a user or an operator or custom. Accordingly, such wordings should be defined on the basis of the contents of the overall specification.

According to the present invention, there is provided a verification method of a sample introduction device dedicated to gas chromatography for precisely measuring a concentration of atmospheric greenhouse gas, which includes the steps of: 1) calculating, by a bias size calculation unit, a degree of bias in a tedlar bag using a correlation between a bias of $P_{bag}$ to $P_{cyl}$ and a bias of $x_{bag}$ to $x_{cyl}$; and 2) determining, by a device performance determination unit, a device having the smallest value of a size of the bias calculated from the bias size calculation unit as an optimal device.

Wherein, $P_{cyl}$ and $P_{bag}$ denote the measured pressures in a sample loop of a gas analyzer (e.g., GC-FID) transferred from a high-pressure gas cylinder for calibration and a tedlar bag under different gas sampling conditions, respectively, and $x_{cyl}$ and $x_{bag}$ denote mole fractions of methane measured using a gas analysis device, respectively.

In addition, a verification system 100 of a sample introduction device dedicated to gas chromatography for precisely measuring a concentration of atmospheric greenhouse gas according to the present invention includes an input means 10, a bias size calculation unit 30, a device performance determination unit 50 and an output means 70, as shown in FIG. 6.

The verification system 100 of the present invention receives the mole fractions of the gas component and pressure information measured in a sample loop SL from the input means 10.

The bias size calculation unit 30 is configured to calculate a degree of bias in the tedlar bag using a correlation between a bias of $P_{bag}$ to $P_{cyl}$ and a bias of $x_{bag}$ to $x_{cyl}$ based on the received information as an input value.

The device performance determination unit 50 is configured to determine a device having the smallest value of a size of the bias calculated from the bias size calculation unit 30 as an optimal device, and output the resultant value to the output means 70.

In the present invention, the bias may be an absolute bias or a relative bias.

That is, the bias may be an absolute bias of $P_{bag}$ to $P_{cyl}$ and an absolute bias of $x_{bag}$ to $x_{cyl}$. In this case, the bias is preferably calculated by Equation I below.

$$B(x_{bag}) = 3.9663 \cdot B(P_{bag}) - 0.2674 \qquad (I)$$

In addition, the bias may be a relative bias of $P_{bag}$ to $P_{cyl}$ and a relative bias of $x_{bag}$ to $x_{cyl}$. In this case, the bias is preferably calculated by Equation II below.

$$B_{rel}(x_{bag}) = 1.2873 \cdot B_{rel}(P_{bag}) = -0.43\% \qquad (II)$$

In the present invention, the bias may be calculated automatically using Equation I or II by simply automatically inputting an input value or by manually inputting an input value.

Hereinafter, the verification method according to the present invention using relational expressions will be described in detail with reference to examples, and specifically, methane, one of the greenhouse gas species, will be described in detail as an example.

Experiment Method

Preparation of Clean Tedlar Bag

A single polypropylene tedlar bag (No. 232-08) with a volume capacity of 2 L was purchased from SKC. This is a single use bag designed for air sampling at atmospheric pressure. Before use, the inside of the tedlar bag was filled with high-purity (99999.7 vmol mol⁻¹) nitrogen containing negligible methane impurities (<0.001 vmol mol⁻¹) and washed, then the residual gas in the bag was removed by continuously repeating this process three times.

To this end, a tedlar bag was prepared by performing all of the following steps of: (1) connecting a high-pressure (about 10 MPa) pure nitrogen gas cylinder to a PTFE tube (made of a polypropylene part and a Teflon-coating barrier) and a final exhaust port via a gas pressure regulator; (2) opening a valve of the tedlar bag; (3) controlling the pressure by a gas pressure regulator to slowly transfer nitrogen gas from the high-pressure cylinder to the tedlar bag; (4) filling the tedlar bag with nitrogen to about 80% of the maximum capacity thereof; (5) closing a valve of the high-pressure nitrogen gas cylinder; (6) closing the valve of the tedlar bag; (7) connecting an exhaust port of the tedlar bag to a diaphragm type vacuum pump through the PTFE tube; (8) opening the exhaust port of the tedlar bag; and (9) turning-on a switch of the vacuum pump to remove residual gas from the bag until the tedlar bag is substantially in a vacuum state.

Preparation of High-Pressure Calibration Gas Cylinder

As a calibration gas cylinder including methane mixed with synthetic air or nitrogen balanced with 78.1% of nitrogen, 21.0% of oxygen, and 0.9% of argon (total 100%) in mole fraction, a 9.5 L aluminum alloy cylinder (Luxfer, UK) was gravimetrically prepared using the gravimetric method derived from SI following international standards.

The mole fraction of methane for the synthetic air balance in the high-pressure cylinder was 48.872 vmol mol⁻¹ (MD6080), while the mole fractions of methane for the nitrogen balance were 28.2988 vmol mol⁻¹ (ME0417) and 28.1437 vmol mol⁻¹ (ME0429), respectively. As a calibration gas cylinder for methane, a gas cylinder based on the gravimetric method was prepared.

The relative expansion uncertainty ($U_{rel}$) of the calibration gas cylinder used in the present experiment was 1.0% with a confidence level of about 95% and a coverage factor (k) of 2, based on the measurement results of KRISS participating in the international comparison CCQM-K82.

Transfer of Calibration Gas Mixture from High-Pressure Gas Cylinder to Tedlar Bag.

After completion of the washing operation, each tedlar bag was filled with the calibration gas mixture so that the volume thereof is about 80% of a predetermined maximum volume capacity in the calibration gas cylinder. tedlar bags were prepared using each calibration gas cylinder. To minimize transient changes in the mole fraction of methane during storage, all tedlar bags were analyzed within 8 hours according to the manufacturer's instructions. The tedlar bags were connected to another device using a PTFE line tube having an inner diameter of 2 mm.

Device and Instrument

To create gas flow by an external force, a diaphragm pump (GAST® Model DOA-P704, USA) and a mini-diaphragm vacuum pump (KNF® Model N815KNDC, USA) were used. A gas flow regulator (Brooks® Model 5850E, Japan)

was calibrated with nitrogen gas at a flow rate of 500 cm³ under standard conditions, and then used.

A gas mass flowmeter (Line Tech® Model M2030V, Korea) was calibrated with nitrogen gas at a flow rate of 1000 mL min⁻¹ under standard conditions, and then used. A gas pressure gauge (ISO Technology, Bpxboro/ICT Model 1123-09A-B51-A1, USA) was used at a measuring range of 0 to 689.47 kPa and a resolution of about 70 Pa. For the measurement of gas pressure values in and out of the GC-FID sample loop, a digital gas pressure indicator (Sensys Model SC 250, Korea) was used.

Gas Analysis Conditions

As shown in FIG. 1, quantitative analysis of methane was performed using GC-FID (Agilent Model 6890). The temperature in the sample loop of the valve box was maintained at 100° C., and the sample loop had a nominal internal volume of 3.0 cm³. The gas sample was injected into the tedlar bag in a separation mode at a separation flow of 16 cm³ min⁻¹ and a separation ratio of 2:1. A fractionation column (HP-PLOT molecular sieve 5A capillary column, length 30.0 m, inner diameter 530 μm, thickness 50.0 μm) was also used.

The temperature of an oven was set to 40° C. in an isothermal mode, and the temperature of the FID was 250° C. N₂ was used as a carrier gas at a flow rate of 8 mL min⁻¹ under a gas pressure of 59.98 kPa. The total gas flow rate was 28.1 mL min⁻¹. The flow rate of fuel gas (H₂) was 45 mL min⁻¹. The flow rate of oxidizing gas (air) was 450 mL min⁻¹. The flow rate of auxiliary gas was 10 mL min⁻¹. The flow rate of sample gas was 300 mL min⁻¹. The retention time of methane in the chromatogram was about 1.74 minutes.

Operating Procedure for Gas Sampling Method

A total of four sampling methods were used for test, and gas injection from the tedlar bag was performed using a stainless steel sample loop of GC-FID depending on the gas type. The gas flow scheme is presented in FIG. 2, which illustrates a total of four different sampling methods combined with GC-FID.

A two-stage gas pressure regulator (GPR) was used to control the pressure of gas discharged from the high-pressure (10 MPa) aluminum alloy calibration gas cylinder.

(1) The pressure of gas discharged from the two-stage GPR was controlled to about 40 mL min⁻¹. Since the gas pressure in the tedlar bag is slightly higher than atmospheric pressure (100 kPa), GPR is not required in the tedlar bag. The reason for using the diaphragm vacuum pump (DVP) is to transfer the gas from the tedlar bag to the GC-FID sample loop (SL). (2) The DVP switch was turned on. (3) The system remained without contact for 30 seconds until the gas flow stabilized. (4) Gas pressures before and after the sample loop were measured. (5) In each method, the gas was analyzed alternately using the calibration gas cylinder and the tedlar bag, which have substantially the same gas composition as each other. (6) Finally, peak areas of methane for each of the tedlar bag and the calibration gas cylinder were determined.

Results of Experiment

Theoretical Basis

The purpose of the present experiment is to find the best sampling method that can measure the same content (mole fraction) of methane in the gas mixture inside the sample loop of the valve box in the GC-FID from the tedlar bag by comparing with the calibration cylinder.

The process of determining a relationship between the gas pressure and the amount of gas substance at a constant temperature and volume starts from the ideal gas equation of state shown in Equation 1 below.

$$PV = nRT \qquad (1)$$

In the above equation, P, V and T are pressure, volume and temperature, respectively; n is the amount (in moles) of gaseous material; and R is the ideal gas constant. This is virtually good approximation for the behavior of all gases under many real conditions. In the present experiment, the ideal gas equation represented by Equation 2 below is applied to all gases filled inside the sample loop of the valve box in the GC-FID.

$$P_{Tot,SL} V_{SL} = n_{Tot,SL} R T_{SL} \qquad (2)$$

In the above equation, $n_{Tot,SL}$ is the amount (in moles) of the gas mixture in the sample loop, $P_{Tot,SL}$ is the gas pressure in the sample loop (kPa), $V_{SL}$ is the fixed volume in the sample loop (cm³), R is the ideal gas constant (cm³ kPa mol⁻¹ K⁻¹), and $T_{SL}$ is the absolute temperature inside the sample loop of the valve box in the GC-FID.

In the present experiment, $V_{SL}$ and $T_{SL}$ are maintained substantially constant. Under the controlled conditions, a ratio of $P_{Tot,SL}$ to $n_{Tot,SL}$ is constant as shown in Equation 3 below.

$$\frac{P_{Tot,SL}}{n_{Tot,SL}} = \frac{RT_{SL}}{V_{SL}} = constant \qquad (3)$$

Here, if $n_{Tot,SL}$ is constant, $P_{Tot,SL}$ is also constant.

First, a linear relationship between the total pressure of the gas mixture and the mole fraction of methane in the gas mixture inside each sample loop from the tedlar bag and the calibration cylinder would be derived. In terms of measuring the gas pressure inside the sample loop, the process starts from an equation of state for component i in the gas mixture inside the sample loop based on the ideal gas equation of state, as shown in Equation 4 below.

$$P_{i,SL} V_{SL} = n_{i,SL} R T_{SL} \qquad (4)$$

In the above equation, $n_{i,SL}$ is the amount (in moles) of component i inside the sample loop, and $P_{i,SL}$ is the gas pressure (kPa) of component i inside the sample loop. The partial pressure of component i in the above equation is determined by Equation 5 below.

$$P_{i,SL} = \frac{n_{i,SL} R T_{SL}}{V_{SL}} \qquad (5)$$

According to Dalton's law of partial pressures, in a non-reactive gas mixture, the total gas pressure exerted inside the sample is equal to the sum of the partial pressures of the individual gas components. The total pressure $P_{Tot,SL}$ Of the gas mixture is defined as the sum of the individual gas components, as shown in Equation 6 below.

$$P_{Tot,SL} = \sum_{i=1}^{m} P_{i,SL} \qquad (6)$$

In the above equation, $P_1$, $P_2$, ... and $P_m$ denote the partial pressures of the respective components 1 to m inside the sample loop. The partial pressure of component i is determined by the product of $P_{Tot,SL}$ and $x_{i,SL}$ as shown in Equation 7 below.

$$P_{i,SL} = P_{Tot,SL} x_{i,SL} \qquad (7)$$

Therefore, as shown in Equation 8 below, the partial pressure of component i is equal to the mole fraction xi.

$$\frac{P_{i,SL}}{P_{Tot,SL}} = \frac{\frac{n_{i,SL} R T_{SL}}{V_{SL}}}{\frac{n_{Tot,SL} R T_{SL}}{V_{SL}}} = \frac{n_{i,SL}}{n_{Tot,SL}} = x_{i,SL} \qquad (8)$$

In the above equation, if the mole fraction of component i transferred from the atmospheric tedlar bag is $x_{i,SL,bag}$, and the partial pressure inside the sample loop of the valve box in the GC-FID is $P_{i,SL,bag}$, it may be represented as in Equation 9 below.

$$x_{i,SL,bag} = \frac{n_{i,SL,bag}}{n_{Tot,SL,bag}} = \frac{P_{i,SL,bag}}{P_{Tot,SL,bag}} \qquad (9)$$

When applied to the high-pressure calibration cylinder in the same way, it may be represented as Equation 10 below.

$$x_{i,SL,cyl} = \frac{n_{i,SL,cyl}}{n_{Tot,SL,cyl}} = \frac{P_{i,SL,cyl}}{P_{Tot,SL,cyl}} \qquad (10)$$

The subscripts "bag" and "cyl" refer to the tedlar bag and calibration gas cylinder, respectively. Now, a ratio of $x_{i,SL,bag}$ to $x_{i,SL,cyl}$ is summarized as in Equation 11 below.

$$\frac{x_{i,SL,bag}}{x_{i,SL,cyl}} = \frac{\frac{P_{i,SL,bag}}{P_{Tot,SL,bag}}}{\frac{P_{i,SL,cyl}}{P_{Tot,SL,cyl}}} \qquad (11)$$

In the present invention, the temperature inside the sample loop of the valve box in the GC-FID is maintained substantially constant (e.g., at 100° C. with a resolution of 0.5° C.), and the nominal internal volume of the sample loop is constant (3.0 cm³).

If the mole fraction of component i inside the sample loop from the tedlar bag is the same as that from the calibration cylinder (i.e., $x_{i,SL,bag} = x_{i,SL,cyl}$) in the controlled state as described above, it may be represented as Equations 12 and 13 below.

$$\frac{P_{i,SL,bag}}{P_{i,SL,cyl}} = \frac{P_{Tot,SL,bag}}{P_{Tot,SL,cyl}} \qquad (12)$$

$$P_{Tot,SL,bag} = P_{Tot,SL,cyl} \qquad (13)$$

Second, in the present invention, a linear relationship between the mole fractions of methane in the gas mixture from each of the tedlar bag and the calibration cylinder and the peak areas on the chromatogram is further derived using Equation 14 below.

$$\frac{x_{i,SL,bag}}{x_{i,SL,cyl}} = \frac{R_{i,SL,bag}}{R_{i,SL,cyl}} \qquad (14)$$

In the above equation, $R_{i,SL,bag}$ and $R_{i,SL,cyl}$ are the peak areas of component i on the chromatogram from the tedlar bag and the calibration cylinder, respectively. If $x_{i,SL,bag} = x_{i,SL,cyl}$, then $R_{i,SL,bag} = R_{i,SL,cyl}$.

Evaluation of Bias in Mole Fraction of Methane and Gas Pressure in the GC-FID Sample Loop The purpose of the present experiment is to find the best gas sampling method using gas chromatography so as to maintain the mole fractions of methane between the tedlar bag and the gas cylinder for calibration the same as each other. As described above, the ideal gas equation and Dalton's law of partial pressures are used to describe the equation of state for each methane sample filled in the valve box sample loop of the GC-FID transferred from the tedlar bag or the calibration gas cylinder.

To prove that the mole fraction of component i (e.g., methane) from the tedlar bag is the same as that from the calibration gas cylinder (i.g., $x_{i,SL,bag} = x_{i,SL,cyl}$), it is required that the total pressures of the gas mixtures in the sample root are ultimately the same as each other (i.e., $P_{Tot,SL,bag} = P_{Tot,SL,cyl}$).

The mole fraction of methane in the sample loop was measured using the GC-FID in four different methods, and each pressure was measured with the pressure gauge at both the inlet and outlet of the sample loop. Results of these experiments are shown in Table 1 below.

TABLE 1

| Method (Rank) | Replicate | Gas Balance | Sample Bag | $P_{cyl}$ (kPa) | $P_{bag}$ (kPa) | $B(P_{bag})$ (kPa) | $B_{rel}(P_{bag})$ (%) | $x_{cyl}$ (μmol · mol⁻¹) | $x_{bag}$ (μmol · mol⁻¹) | $B(x_{bag})$ (μmol · mol⁻¹) | $B_{rel}(x_{bag})$ (%) |
|---|---|---|---|---|---|---|---|---|---|---|---|
| 1 | A | Air | SB.1 | 105.15 | 105.21 | 0.07 | 0.2 | 48.872 | 48.667 | −0.205 | −0.42 |
| 2 | A | Air | SB.1 | 103.63 | 100.53 | −3.10 | −3.0 | 48.872 | 46.633 | −2.239 | −4.58 |
| 3 | A | Air | SB.1 | 108.66 | 104.52 | −4.14 | −3.8 | 48.872 | 46.408 | −2.464 | −5.04 |
| 4 | A | Air | SB.1 | 107.77 | 98.60 | −9.17 | −8.5 | 48.872 | 43.310 | −5.562 | −11.38 |

In the above Table 1, $P_{cyl}$ and $P_{bag}$ denote the measured pressures (kPa) in the GC-FID sample loop transferred from the high-pressure gas cylinder and the tedlar bag under four different gas sampling conditions, respectively. $x_{cyl}$ and $x_{bag}$ denote the mole fraction of methane measured using the GC-FID, respectively.

A relative difference (%) in the gas pressure in the SL transferred from the high-pressure calibration gas cylinder and the tedlar bag was evaluated. $B_{rel}(P_{bag})$ is defined as the relative difference between $P_{cyl}$ and $P_{bag}$, as shown in Equation 15 below.

$$B_{rel}(P_{bag}) = \frac{P_{bag} - P_{cyl}}{P_{cyl}} \cdot 100\% \tag{15}$$

Values of $P_{cyl}$ and $P_{bag}$ in SL under an idle condition of the diaphragm vacuum pump were 100.73 kPa and 100.93 kPa, respectively, which were the same as the ambient pressure. When using Method 1, the values of $P_{cyl}$ and $P_{bag}$ in the SL under an operating condition of the vacuum pump were 105.15 kPa and 105.21 kPa, respectively. As can be seen in Table 1, there was no significant difference between the values of $P_{cyl}$ and $P_{bag}$ when using Method 1.

An apparent difference of 0.07 kPa is matched well with the specified limit of the resolution of the gas pressure gauge the gas flow path without interfering with essential functions. Second, the MFC should be directly connected to the gas container to perform its normal function so as to control the ideal gas flow regardless of the type of the sample container.

Method 1 should be able to satisfy two requirements: 1) the MFC was spaced apart from DVP between the SLs; and 2) the MFC was directly connected to the gas container. In Method 2, the MFC and the adjacent DVP were connected together behind the SL, thereby significantly interfering with the MFC's normal function to maintain the ideal gas flow conditions (−3.0%) when sampled from the tedlar bag and the calibration cylinder.

In Method 3, the DVP and the MFC were positioned adjacently and coupled with each other before the SL, thereby cooperatively causing an occurrence of a significant mismatch (−3.8%) between $P_{cyl}$ and $P_{bag}$ in the SL. In method 4, a notable bias (−8.5%) between $P_{bag}$ and $P_{cyl}$ occurred because the mass flow meter (MFM) did not have a function to control the gas flow.

An absolute difference in the mole fraction of methane between the high-pressure cylinder and the tedlar bag was evaluated. Values of the peak area of methane in the SL of the GC-FID on the chromatogram was significantly different depending on the gas sampling method. As can be seen from Table 2 below, when Method 1 was used, the peak areas of methane between the tedlar bag ($R_{bag}$) and the high-pressure cylinder ($R_{cyl}$) were matched best.

TABLE 2

| Method (Rank) | Repli-cate | Balance Gas | Sample Bag | $x_{bag}$ ($\mu$mol · mol$^{-1}$) | $B(x_{bag})$ ($\mu$mol · mol$^{-1}$) | $B_{rel}(x_{bag})$ (%) | $u(x_{bag})_{PREC}$ ($\mu$mol · mol$^{-1}$) | $U(x_{bag})_{PREC}$ ($\mu$mol · mol$^{-1}$) | $U(x_{bag})_{PREC}$ (%) | D |
|---|---|---|---|---|---|---|---|---|---|---|
| 1 | A | Air | SB.1 | 48.667 | −0.205 | −0.42 | 0.249 | 0.498 | 1.0 | 0.21 |
| 1 | B | Air | SB.1 | 48.562 | −0.310 | −0.63 | 0.244 | 0.488 | 1.0 | 0.32 |
| 1 | C | N$_2$ | SB.2 | 28.216 | −0.083 | −0.29 | 0.142 | 0.284 | 1.0 | 0.15 |
| 1 | D | N$_2$ | SB.3 | 27.910 | −0.234 | −0.83 | 0.142 | 0.284 | 1.0 | 0.41 |
| 2 | A | Air | SB.1 | 46.633 | −2.239 | −4.58 | 0.245 | 0.490 | 1.1 | 2.28 |
| 2 | B | Air | SB.1 | 46.368 | −2.504 | −5.12 | 0.244 | 0.488 | 1.1 | 2.55 |
| 2 | C | Air | SB.1 | 46.408 | −2.464 | −5.04 | 0.249 | 0.498 | 1.1 | 2.49 |
| 2 | D | Air | SB.1 | 46.871 | −2.001 | −4.09 | 0.252 | 0.504 | 1.1 | 2.01 |
| 3 | A | Air | SB.1 | 46.408 | −2.464 | −5.04 | 0.249 | 0.498 | 1.1 | 2.49 |
| 4 | A | Air | SB.1 | 43.310 | −5.562 | −11.38 | 0.245 | 0.490 | 1.1 | 5.68 | used in the present experiment, which indicates a negligible difference (70 Pa) within the measurement uncertainty of the pressure gauge alone.

The size of the relative difference in the gas pressure in terms of $B_{rel}(P_{bag})$ was less than 0.2%. Unlike Method 1, other gas sampling methods (methods 2, 3 and 4) exhibited the notable differences. The size of the relative difference in the gas pressure in the SL in terms of $B_{rel}(P_{bag})$ was −3.0%, −3.8% and −8.5% in Methods 2, 3 and 4, respectively.

Herein, it is necessary to describe the possible reason why Method 1, the best sampling method, exhibited negligible bias. FIG. 2 illustrates a gas delivery path of each sampling method from a gas container to a final exhaust port. In the present experiment, the important function of a mass flow regulator (MFC) is to maintain the gas flow rate from the gas container to the SL, and the diaphragm vacuum pump (DVP) serves to transfer the gas sample from the gas container to the SL.

The purpose of the best method is to establish ideal gas flow conditions when sampling from the high-pressure gas cylinder and the atmospheric tedlar bag.

First, the MFC and the DVP should perform normal roles independently with being spaced apart from each other in Using the peak areas obtained from the GC-FID analysis, Equation 16 below was used to calculate the mole fraction $x_{bag}$ of methane of the tedlar bag to the certified mole fraction $x_{cyl}$ of methane of the corresponding calibration cylinder under four different gas sampling conditions.

$$x_{bag} = \frac{R_{bag}}{R_{cyl}} \cdot x_{cyl} \tag{16}$$

In the above equation, R is the arithmetic average of reaction peak area values on the chromatogram of the GC-FID. The subscripts "bag" and "cyl" denote the tedlar bag and calibration gas cylinder to be compared, respectively.

The absolute bias of $x_{bag}$ to $x_{cyl}$ is defined as B ($x_{bag}$), i.e. B ($x_{bag}$)=$x_{bag}$−$x_{cyl}$. Furthermore, the relative scale of B, $B_{rel}(x_{bag})$, is defined as the relative bias between a reference value of the mole fraction $x_{cyl}$ of methane assigned from the calibration cylinder and the mole fraction $x_{bag}$ of methane measured from the tedlar bag under inspection.

Among the four gas sampling methods used in the present experiment for test, Method 1 exhibited a negligible bias (B)

13 of −0.205 vmol·mol⁻¹, as shown in Table 1. Unlike the results of Method 1, the other methods exhibited significant biases (−2.239, −2.464 and −5.562 vmol·mol⁻¹ in the case of Methods 2, 3 and 4, respectively).

In terms of $B_{rel}(x_{bag})$, the other methods exhibited significant large biases (−4.58%, −5.04% and 11.38% for Methods 2, 3 and 4, respectively), whereas Method 1 has worked best (−0.42%).

From all the above results, it is suggested that positioning of the necessary equipment for controlled delivery of the sample gas to the SL is important to ensure accuracy in the mole fraction of methane from the tedlar bag in direct comparison with methane in the high-pressure cylinder. Method 1 was the best choice for making mutually equal pressure between the tedlar bag and the corresponding calibration gas cylinders.

From the above experimental results, it is meaningful to investigate whether there is a possible correlation between the bias in the gas pressure inside the SL and the tedlar bag and the bias in the mole fraction of methane. As shown in FIG. 3, the bias of the gas pressure inside the SL for the tedlar bag (SB.1) from the gas pressure inside the SL to the calibration cylinder (ME6080) exhibited a significant positive linear correlation with the bias in the mole fraction of methane (Pearson's correlation coefficient, r=0.998, p<0.05). Furthermore, it was confirmed that there is a linear causal relationship between the bias in the gas pressure inside the SL as an independent variable and the bias in the mole fraction of methane as a dependent variable. A simple linear regression equation was estimated as shown in Equation 18 below using the least squares method.

$$B(x_{bag}) = 3.9663 \cdot B(P_{bag}) - 0.2674 \tag{18}$$

A slope and an intercept of the above equation were 3.9663 vmol·mol⁻¹·kPa⁻¹ and −0.2674 vmol·mol⁻¹, respectively. A coefficient of determination ($R^2$) was 0.9953, which proves that the bias in the gas pressure inside the SL is a major factor affecting the bias in the mole fraction of methane.

For Method 1, the experimentally measured absolute level of bias for the mole fraction of methane (0.205 vmol·mol⁻¹) is substantially comparable to the standard error (Se) of the linear regression equation (0.1862 vmol·mol⁻¹). This suggests that the level of bias for Method 1 is negligible in light of the uncertainty of the bias in the gas pressure inside the SL.

A similar pattern of the regression equation at a relative scale was estimated as shown in Equation 19 below.

$$B_{rel}(x_{bag}) = 1.2873 \cdot B_{rel}(P_{bag}) - 0.43\% \tag{19}$$

The slope and intercept of the above equation were 1.2873 and −0.43%, respectively. The coefficient of determination ($R_2$) was 0.9968. The absolute level of the measured relatively small bias (0.42%) in the mole fraction of methane (0.205 vmol mol⁻¹) for Method 1 is only slightly larger than the level of the standard error (Se) of the linear regression equation (0.23%).

14

Measurement Uncertainty Model and Decision Making Criterion

In the present experiment, a single-point through-origin (SPTO) calibration was used to estimate the mole fraction of methane based on the measurement equation of Equation 20 below.

$$x_{bag} = \frac{R_{bag}}{R_{cyl}} \cdot x_{cyl} \tag{20}$$

In the above equation, $x_i$ is the mole fraction of methane, R is the arithmetic average of the reaction peak area values, and the subscripts denote the high-pressure gas cylinder and the tedlar bag used for comparison, respectively. The two necessary assumptions are that the calibration curve should be linear, and that the line should pass zero instrument response (e.g., GC-FID) as shown in FIG. 4.

These assumptions are generally satisfied if the instrument response is free of statistically significant noise beyond the detection level. The measurement uncertainty associated with the mole fraction of methane inside the SL transferred from the tedlar bag is estimated as shown in Equation 21 below based on the above equation.

$$u_c(x_{bag}) = u\left[\frac{R_{bag}}{R_{cyl}} \cdot x_{cyl}\right] \tag{21}$$

When applying the uncertainty propagation law for multiplication to the above equation, it may be represented as Equation 22 below.

$$\left[\frac{u_c(x_{bag})}{R_{bag}}\right]^2 = \left[\frac{u(R_{bag})}{R_{bag}}\right]^2 + \left[\frac{u(R_{cyl})}{R_{cyl}}\right]^2 + \left[\frac{u(x_{cyl})}{x_{cyl}}\right]^2 \tag{22}$$

Therefore, it may be further represented as Equation 23 below.

$$u_c(x_{bag}) = x_{bag}\sqrt{\left[\frac{u(R_{bag})}{R_{bag}}\right]^2 + \left[\frac{u(R_{cyl})}{R_{cyl}}\right]^2 + \left[\frac{u(x_{cyl})}{x_{cyl}}\right]^2} \tag{23}$$

When using variance, it may be represented as Equation 24 below.

$$u_c(x_{bag}) = \sqrt{\left[\frac{x_{bag}}{R_{bag}}u(R_{bag})\right]^2 + \left[\frac{x_{bag}}{R_{cyl}}u(R_{cyl})\right]^2 + \left[\frac{x_{bag}}{x_{cyl}}u(x_{cyl})\right]^2} \tag{24}$$

An effective degree of freedom of $u_c(x_{bag})$ defined by $V_{eff}[u_c(x_{bag})]$ is as shown in Equation 25 below.

$$v_{eff}[u(x_{bag})] \simeq \frac{[u_c(x_{bag})]^4}{\frac{\left[\frac{x_{bag}}{R_{bag}}u(R_{bag})\right]^4}{v(R_{bag})} + \frac{\left[\frac{x_{bag}}{R_{cyl}}u(R_{cyl})\right]^4}{v(R_{cyl})} + \frac{\left[\frac{x_{bag}}{x_{cyl}}u(x_{cyl})\right]^4}{v(x_{cyl})}} \tag{25}$$

Gas analysis was performed in n multiples (n≥3) based on a time sequence starting from the calibration cylinder to the tedlar bag (subscript S) and ending again with the same calibration cylinder (subscript E) (e.g., $R_{cyl,S1}$–$R_{cyl,S2}$–$R_{cyl,S3}$–$R_{bag,1}$–$R_{bag,2}$–$R_{bag,3}$–$R_{cyl,E1}$–$R_{cyl,E2}$–$R_{cyl,E3}$).
Therefore, the average peak area of methane in the calibration gas cylinder was determined using Equation 26 below.

$$R_{cyl} = \frac{1}{2}(R_{cyl,S} + R_{cyl,E}) \tag{26}$$

In the above equation, $R_{cyl,s}$ and $R_{cyl,E}$ denote average peak areas at the start and end points, respectively. The standard uncertainty of the average peak area of methane in the calibration cylinder may be represented as Equation 27 below.

$$u(R_{cyl}) = u\left[\frac{1}{2}(R_{cyl,S} + R_{cyl,E})\right] \tag{27}$$

Considering that there is no significant correlation between $R_{cyl,s}$ and $R_{cyl,E}$, when applying the uncertainty propagation law for addition or subtraction to Equation 27, it may be represented as Equation 28 below.

$$u^2(R_{cyl}) = \frac{1}{4}\left[u^2(R_{cyl,S}) + u^2(R_{cyl,E})\right] \tag{28}$$

Therefore, it may be further represented as Equation 29 below.

$$u(R_{cyl}) = \frac{1}{2}\sqrt{u^2(R_{cyl,S}) + u^2(R_{cyl,E})} \tag{29}$$

In the above expression, $$u(R_{cyl,S}) = \frac{s(R_{cyl,S})}{\sqrt{n}}, u(R_{cyl,E}) = \frac{s(R_{cyl,E})}{\sqrt{n}},$$

and $s(R_{cyl,s})$ and $s(R_{cyl,E})$ are the sample standard bias of the peak areas from the calibration cylinder at the start and end points, respectively. The standard uncertainty of the peak area for methane from the tedlar bag is represented by $$u(R_{bag}) = \frac{s(R_{bag})}{\sqrt{n}},$$

wherein $s(R_{bag})$ denotes the sample standard bias of the peak area of methane from the tedlar bag.

The effective degree of freedom of defined by $v_{eff}[u_c(x_{bag})]$ may be determined as shown in Equation 30 below based on the well-known Welch-Satterthwaite equation.

$$v_{eff}[u_c(x_{bag})] \simeq \frac{\left([u_c(x_{bag})]^4\right)}{\frac{\left[\frac{(r_{bag} - R_{cyl})}{f_{cyl}}\sqrt{\left[\frac{u^2(R_{cyl})}{R_{cyl}^2} + \frac{u^2(x_{cyl})}{x_{cyl}^2}\right]}\right]^4}{v(f_{cyl})} + \frac{\left[\frac{1}{f_{cyl}}u(R_{bag})\right]^4}{v(R_{bag})} + \frac{\left[\frac{1}{f_{cyl}}u(R_{cyl})\right]^4}{v(R_{cyl})} + \frac{[u(x_{cyl})]^4}{v(x_{cyl})}} \tag{30}$$

Here, it may be again represented as Equation 31 below.

$$v[u(f_{cyl})] \simeq \frac{[u(f_{cyl})]^4}{\frac{\left[\frac{f_{cyl}}{R_{cyl}}u(R_{cyl})\right]^4}{v(R_{cyl})} + \frac{\left[\frac{f_{cyl}}{x_{cyl}}u(x_{cyl})\right]^4}{v(x_{cyl})}} \tag{31}$$

Since the first term, $$\frac{\left[\frac{(R_{bag} - R_{cyl})}{f_{cyl}}\sqrt{\left[\frac{u^2(R_{cyl})}{R_{cyl}^2} + \frac{u^2(x_{cyl})}{x_{cyl}^2}\right]}\right]^4}{v(f_{cyl})},$$

in the denominator of Equation (30) is negligible compared to the other terms, it may be further represented as in Equation 32 below.

$$v_{eff}[u_c(x_{bag})] \simeq \frac{[u_c(x_{bag})]^4}{\frac{\left[\frac{1}{f}u(R_{bag})\right]^4}{v(R_{bag})} + \frac{\left[\frac{1}{f}u(R_{cyl})\right]^4}{v(R_{cyl})} + \frac{[u(x_{cyl})]^4}{v(x_{cyl})}} \tag{32}$$

The size of $v_{eff}[u_c(x_{bag})]$ is determined by $v(u(R_{cyl}))$ and $v[u(R_{bag})]$ based on the Student's t-distribution, and $v[u(x_{cyl})]$ is based on the assumed normal distribution.

The cover coefficient k is a function of the specific reliability (CL) and $v_{eff}[u_c(x_{bag})]$, and is estimated using the Student's t-statistic as shown in Equation 33 below.

$$k = t_{CL}\{v_{eff}[u_c(x_{bag})]\} \tag{33}$$

Finally, the expanded uncertainty is estimated using Equation 34 below.

$$U(x_{bag}) = k \cdot u_C(x_{bag}) \tag{34}$$

$U(x_{bag})$ is the expanded uncertainty associated with the mole fraction of methane from the tedlar bag at the 95% confidence level, which is about twice the standard uncertainty $u(x_{bag})$ associated with the mole fraction of methane from the tedlar bag.

In order to determine whether methane in the tedlar bag is distinct from methane in the calibration cylinder based on the Student's t-test, it is noteworthy to establish a quantitative equivalence criterion using Equation 35 below.

17

$$|x_{bag} - x_{cyl}| \leq U(|x_{bag} - x_{cyl}|) \qquad (35)$$

The equivalence criterion D is as shown in Equation 35 below.

$$D = \frac{|x_{bag} - x_{cyl}|}{U(|x_{bag} - x_{cyl}|)} \leq 1 \qquad (36)$$

Here, the denominator is represented as Equation 37 below.

$$U(|x_{bag} - x_{cyl}|) = \qquad (37)$$
$$\sqrt{U^2(x_{bag})_{PREC} + U^2(x_{cyl}) + 2 \cdot U(x_{bag})_{PREC} \cdot U(x_{cyl}) \cdot r(x_{bag}, x_{cyl})}$$

Due to the substantially perfect positive correlation between $x_{bag}$ and $x_{cyl}$ in the present example, the conservative grade $U^*(|x_{bag}-x_{cyl}|)$ is equal to the sum of $U(x_{bag})_{PREC}$ and $U(x_{cyl})$, as shown in Equations 38 and 39 below.

$$U(|x_{bag} - x_{cyl}|) = \qquad (38)$$
$$\sqrt{U^2(x_{bag})_{PREC} + U^2(x_{cyl}) + 2 \cdot U(x_{bag})_{PREC} \cdot U(x_{cyl}) \cdot 1}$$
$$U(|x_{bag} - x_{cyl}|) = U(x_{bag})_{PREC} + U(x_{cyl}) \qquad (39)$$

As a result, it may be represented as Equation 40 below.

$$D = \frac{|B(x_{bag})|}{U(x_{bag})_{PREC} + U(x_{cyl})} \qquad (40)$$

If D is less than or equal to 1.0, $x_{bag}$ is statistically indistinguishable from $x_{cyl}$ at the about 95% confidence level.

Comparison of Measurement Uncertainty and Method Performance

The bias for the mole fraction of methane from the tedlar bag was evaluated on the corresponding cylinders under four different sampling conditions as presented in Table 2 below. In addition, results obtained from the uncertainty estimation are shown in Table 2, and a single-point through-origin (SPTO) calibration model was applied to the experimental data set.

As a typical example for assessing the uncertainty in detail, uncertainty budgets for the results obtained from Test 1.A are shown in Table 3 below. These uncertainty budgets use a standardized format which includes uncertainty sources, standard uncertainties, uncertainty types, assumed probability distributions, degrees of freedom, and relative distributions from each uncertainty source.

18

The single major source of uncertainty was the mole fraction of methane in the calibration cylinder, and the peak area (3.5%) of methane for the tedlar bag and the peak area (0.1%) of methane for the calibration cylinder are incidental under the analytical testing conditions.

The size of the expanded uncertainty associated with the mole fraction of methane in the tedlar bag may be visually compared with the size of the observed bias as shown in FIG. 5. The null hypothesis ($H_0$) in the present experiment is that there is no statistically significant bias in $x_{bag}$ to $x_{cyl}$ at the 95% confidence level. Conversely, the alternative hypothesis ($H_1$) is that there is a statistically significant bias in $x_{bag}$ to $x_{cyl}$. These are shown in Equations 41 and 42 below.

$$H_0: B(x_{bag}) = x_{bag} - x_{cyl} = 0 \qquad (41)$$
$$H_1: B(x_{bag}) = x_{bag} - x_{cyl} \neq 0 \qquad (42)$$

The results for tests 1.A and 1.B exhibited a statistically negligible (P>0.95) relative bias, $B_{rel}(x_{bag})$, (−0.42% and −0.63%), respectively, as compared to the relative uncertainties for methane at 48.667 vmol mol$^{-1}$ and 48.562 vmol mol$^{-1}$ with air balance.

Here, P denotes a statistical P value, which indicates the probability of supporting the null hypothesis. In addition, the smaller mole fractions of methane for the tedlar bag (28.216 vmol mol$^{-1}$ and 27.910 vmol mol$^{-1}$ with $N_2$ balance) exhibited the similar sizes of $B_{rel}(x_{bag})$ (−0.29% and −0.83%) to those of larger mole fractions (−0.42% and −0.63%) of methane at 48.667 vmol mol$^{-1}$ and 48.562 vmol mol$^{-1}$ with air balance.

Values of equivalence determination criterion D based on the uncertainty estimate for tests 1.A to 1.D were less than 1.0 (0.21, 0.32, 0.15 and 0.41, respectively). These results suggest that the mole fraction of methane from the tedlar bag is statistically indistinguishable from that of methane from the corresponding calibration cylinder, regardless of the size of the mole fraction of methane and the type of balance gas under the testing conditions.

Conversely, the results under the different sampling conditions (Tests 2.A, 2.B, 2.C, 2.D, 3.A and 4.A) exhibit that the mole fraction of methane from the tedlar bag is significantly different (P<0.05) from that of methane from the corresponding calibration cylinder based on the uncertainty estimate in statistics.

CONCLUSION

The best gas sampling method (Method 1) exhibits that the gas pressures in the sample loop of the GC-FID between the tedlar bag and the calibration gas cylinder are matched best. This sampling method illustrates a negligible bias (relatively −0.29% to −0.83%) in the mole fraction of

TABLE 3

| Uncertainty Source | Value (Units) | Standard Uncertainty | Magnitude (Units) | Type | PDF | v | h (Units) |
|---|---|---|---|---|---|---|---|
| $R_{bag}$ | 242.92 (pA · s) | u($R_{bag}$) | 0.23 (pA · s) | A | Student's t | 2 | 3.5% |
| $R_{cyl}$ | 241.90 (pA · s) | u($R_{cyl}$) | 0.03 (pA · s) | A | Student's t | 5 | 0.1% |
| $x_{cyl}$ | 48.872 (μmol · mol$^{-1}$) | u($x_{cyl}$) | 0.244 (μmol · mol$^{-1}$) | B | Normal | ∞ | 96.4% |
| $x_{bag}$ | 48.667 (μmol · mol$^{-1}$) | u($x_{bag}$) | 0.249 (μmol · mol$^{-1}$) | C | Normal | 1644 | |
| $U(x_{bag})$ | 0.501 (μmol · mol$^{-1}$) | k = 2.0 | Level of confidence: approximately 95% | | | | | methane from the tedlar bag compared to that of methane from the calibration gas cylinder. On the other hand, the other methods exhibit a significant bias (relatively −4.1% to −11.4%). A sophisticated measurement uncertainty estimation model was derived using the single-point through-origin (SPTO) calibration as an actual example applied to gas analysis. The bias observed using the best sampling method was certainly within the relative expanded uncertainty (1.01% to 1.03%) associated with the mole fraction of methane. The findings in the present experiment indicate an important and useful means that can be widely applied to the standardized analytical measurement in a variety of fields.

Meanwhile, combinations of the respective blocks in the block diagram attached to the present disclosure and the respective steps in the flowchart may be performed by computer program instructions. These computer program instructions may be installed in the processor of a general purpose computer, special purpose computer, or other programmable data processing equipment, such that the instructions, executed by the processor of the computer or other programmable data processing equipment, will create means for performing the functions described in the respective blocks of the block diagram. These computer program instructions may also be stored in a computer-usable or computer-readable recording medium or memory which may direct the computer or other programmable data processing equipment, to implement a function in a particular manner, such that the instructions stored in the computer-usable or computer-readable recording medium or memory may produce an article of manufacture including instruction means which perform the functions described in the respective blocks of the block diagram. Further, the computer program instructions may be installed in a computer or other programmable data processing equipment, such that a series of operating steps are performed on the computer or other programmable data processing equipment to create a process executed by the computer, and thereby the instructions which execute the computer or other programmable data processing equipment may also provide steps for performing the functions described in the respective blocks of the block diagram.

In addition, the respective blocks may represent modules, segments, or parts of codes including at least one or more executable instructions for performing specific logical function(s). Moreover, it should be noted that the functions mentioned in the blocks may be performed in different order in several alternative embodiments. For example, two successive blocks may in fact be performed substantially at the same time, or may sometimes be performed in reverse order according to functions thereof.

The above description is merely illustrative of the technical idea of the present invention, and those skilled art to which the present invention pertains will appreciate that various modifications and variations are possible without departing from the essential characteristics of the present invention. Therefore, the embodiments disclosed in the present invention are intended to describe the technical idea of the present invention, and are not intended to limit the same, as well as the scope of the technical idea of the present invention is not limited to these embodiments. It should be understood that the protective scope of the present invention is interpreted by the claims below, and all technical ideas within the equivalent range are included in the scope of the present invention.

What is claimed is:

1. A verification method of sample introduction devices dedicated to gas chromatography for precisely measuring a concentration of atmospheric greenhouse gas, the method comprising the steps of:

calculating, by a bias size calculator, a bias size in a tedlar bag using a correlation between a pressure bias of $P_{bag}$ to $P_{cyl}$ and a mole fraction bias of $x_{bag}$ to $x_{cyl}$; and determining, by a device performance determinator, a device having a smallest value of the bias size calculated from the bias size calculator, among the sample introduction devices, as optimal, wherein $P_{cyl}$ and $P_{bag}$ denote measured pressures in a sample loop of a gas analyzer transferred from a high-pressure gas cylinder for calibration and the tedlar bag, respectively, and $x_{cyl}$ and $x_{bag}$ denote measured mole fractions of methane in gases transferred from the high-pressure gas cylinder for calibration and the tedlar bag, respectively.

2. The method according to claim 1, wherein the pressure bias is an absolute bias of $P_{bag}$ to $P_{cyl}$, and the mole fraction bias is an absolute bias of $x_{bag}$ to $x_{cyl}$.

3. The method according to claim 2, wherein the correlation is represented by Equation I below:

$$B(x_{bag}) = 3.9663 \cdot B(P_{bag}) - 0.2674. \tag{I}$$

4. The method according to claim 1, wherein the pressure bias is a relative bias of $P_{bag}$ to $P_{cyl}$, and the mole fraction bias is a relative bias of $x_{bag}$ to $x_{cyl}$.

5. The method according to claim 4, wherein the correlation is represented by Formula II below:

$$B_{rel}(x_{bag}) = 1.2873 \cdot B_{rel}(P_{bag}) - 0.43\%. \tag{II}$$

6. A verification system of sample introduction devices dedicated to gas chromatography for precisely measuring a concentration of atmospheric greenhouse gas, the system comprising:

a bias size calculator configured to calculate a bias size in a tedlar bag using a correlation between a pressure bias of $P_{bag}$ to $P_{cyl}$ and a mole fraction bias of $x_{bag}$ to $x_{cyl}$; and a device performance determinator configured to determine a device having a smallest value of the bias size calculated by the bias size calculator, among the sample introduction devices, as optimal.

7. The system according to claim 6, wherein the correlation is represented by Equation I below:

$$B(x_{bag}) = 3.9663 \cdot B(P_{bag}) - 0.2674. \tag{I}$$

8. The system according to claim 6, wherein the correlation is represented by Formula II below:

$$B_{rel}(x_{bag}) = 1.2873 \cdot B_{rel}(P_{bag}) - 0.43\%. \tag{II}$$

9. A non-transitory computer readable recording medium recorded with a program which executes the verification method of sample introduction devices dedicated to gas chromatography for precisely measuring the concentration of atmospheric greenhouse gas according to claim 1.

\* \* \* \* \*